United States Patent
Hanson

(10) Patent No.: US 11,462,916 B2
(45) Date of Patent: Oct. 4, 2022

(54) CAPACITOR PRE-CHARGING CIRCUITS

(71) Applicant: Hamilton Sundstrand Corporation, Charlotte, NC (US)

(72) Inventor: Michael J. Hanson, Rockford, IL (US)

(73) Assignee: Hamilton Sundstrand Corporation, Charlotte, NC (US)

(*) Notice: Subject to any disclaimer, the term of this patent is extended or adjusted under 35 U.S.C. 154(b) by 397 days.

(21) Appl. No.: 16/672,006

(22) Filed: Nov. 1, 2019

(65) Prior Publication Data

US 2021/0135471 A1 May 6, 2021

(51) Int. Cl.
*H02J 7/00* (2006.01)
*H02M 3/335* (2006.01)
*H02J 7/34* (2006.01)

(52) U.S. Cl.
CPC .......... *H02J 7/00* (2013.01); *H02M 3/33523* (2013.01); *H02J 7/345* (2013.01); *H02J 2207/20* (2020.01)

(58) Field of Classification Search
CPC ....................................................... H02J 7/00
See application file for complete search history.

(56) References Cited

U.S. PATENT DOCUMENTS

| | | | |
|---|---|---|---|
| 4,254,365 A | 3/1981 | Knight | |
| 4,641,229 A | 2/1987 | Easter | |
| 5,278,746 A | 1/1994 | Matsumoto | |
| 5,331,532 A | 7/1994 | Iwai et al. | |
| 6,288,504 B1 | 9/2001 | Imamura et al. | |
| 10,199,928 B1* | 2/2019 | Wiedenbauer | ......... H02H 9/001 |
| 2016/0365801 A1* | 12/2016 | Phadke | .................. H02M 1/34 |

FOREIGN PATENT DOCUMENTS

| | | |
|---|---|---|
| CN | 105914829 B | 12/2018 |
| JP | S6037019 A | 2/1985 |
| JP | 2010057290 A | 3/2010 |
| KR | 20180089826 A | 8/2018 |

OTHER PUBLICATIONS

Extended European search report issued in corresponding EP application No. 20205242.9, dated Mar. 10, 2021.

* cited by examiner

*Primary Examiner* — Robert Grant
(74) *Attorney, Agent, or Firm* — Locke Lord LLP; Daniel J. Fiorello; Gabrielle Gelozin

(57) ABSTRACT

A capacitor pre-charge circuit configured to avoid inrush to a capacitor can include a plurality of components configured to ramp a pre-charge voltage over time up to a voltage maximum such that the a pre-charge voltage-over-time curve is not an asymptote. The plurality of components can be configured to linearly ramp voltage, for example, to the voltage maximum. In certain embodiments, the circuit can include an integrated voltage sense circuit.

15 Claims, 6 Drawing Sheets

CAPACITOR PRE-CHARGING CIRCUITS

FIELD

This disclosure relates to electrical power circuits, more specifically to capacitor pre-charging circuits.

BACKGROUND

As system power levels increase, capacitor pre-charge provisions become more cumbersome. Typically, an electrical mechanical relay with a series resistor is used to "trickle charge" a capacitor. This is done to avoid excessive in-rush. The resistor must be large to account for both large current and high voltage. It may be necessary to place several resistors in series, either for power or for voltage, or both. These problems get exponentially worse as voltages increase. Typical pre-charge includes a pre-charge mechanical relay that can be engaged to pre-charge the capacitor. When the capacitor has charged, the main relay or contactor is closed and the pre-charge relay is opened (or in reverse order). In aircraft systems, for example, these relays and series resistors are bulky.

As system voltages increase, voltage sensing becomes more complicated. For example, the circuit described above generally requires two voltage sense circuits, one on each side of the main contactor. A typical voltage sense circuit consists of a resistive voltage divider. At low voltages, such as 28 VDC, this approach is relatively problem free. With higher voltages, the impedance of the divider increases to avoid excessive losses. To tolerate the higher voltages, resistor strings are typically employed. As the impedance increases to limit losses, susceptibility to moisture-induced leakage also increases. At hundreds-of-volts, high value precision resistors also suffer reliability problems because the resistive element must be thinner. Thus, voltage sense in high voltage applications suffers either from high dissipation, or susceptibility to moisture, for example.

Another approach is the e-field sense. The e-field sense uses a very high input impedance amplifier that approximates a capacitive voltage divider, rather than resistive. An amplifier will still require biasing to prevent tiny leakages from building up destructive voltages, and to keep the divider signal within the range of the amplifier. The high impedance biasing and the input leakage of an amplifier will create a measurement drift. Consequently, the e-field sense circuit is only effective in measuring AC voltage or momentary DC voltage. It is not practical for continuous DC voltage measurements.

Such conventional methods and systems have generally been considered satisfactory for their intended purpose. However, there is still a need in the art for both improved capacitor pre-charging circuits and improved high voltage DC voltage measurement circuits. The present disclosure provides a solution for these needs.

SUMMARY

A capacitor pre-charge circuit configured to avoid inrush to a capacitor can include a plurality of components configured to ramp a pre-charge voltage over time up to a voltage maximum such that the a pre-charge voltage-over-time curve is not an asymptote. The plurality of components can be configured to linearly ramp voltage, for example, to the voltage maximum. In certain embodiments, the circuit can include an integrated voltage sense circuit.

The circuit can include a main input line, a main power line connected to the main input line, a pre-charge input line, an output-to-capacitor voltage line connecting the capacitor to the main power line and the plurality of components in parallel, a voltage sense circuit configured to sense an input voltage and/or the pre-charge voltage, and a ground line configured to connect the capacitor to ground and the plurality of components in parallel. The pre-charge input line can be connected to the main input line in parallel with the main power line.

The plurality of components can include a controller, at least one switch, and a flyback circuit. The controller can be configured to control the at least one switch to cause the flyback circuit to ramp the pre-charge voltage. The flyback circuit can include a first inductor magnetically coupled to a second inductor and at least one diode connected to the first inductor to form a flyback pathway.

In certain embodiments, the at least one switch can include a first switch and a second switch. The first switch can be disposed on the pre-charge input line between the main input line and the first inductor to selectively allow current to pass from the main input line and the pre-charge input line to the first inductor. The circuit can include a return line connected to the ground line and a first line connected to the pre-charge input line in between of the first inductor and the first switch such that the first line is in parallel with the pre-charge line ahead of the first inductor. The first line can be connected to the return line. The circuit can include a second line connected in between of the first inductor and the second switch and to the output-to-capacitor line, and a third line connected to the second line and the return line. The first inductor can be disposed between the first line and the second line. The at least one diode can include a first diode disposed on the first line and configured to allow current flow toward the first inductor, a second diode disposed on the second line and configured to allow current flow toward the capacitor, and a third diode disposed on the third line and configured to allow current flow from the return line to the second line. The second switch can be disposed between the first inductor and/or second line and the return line. The second inductor can be connected in a voltage sense circuit.

The controller can be configured to perform a method to operate the circuit. The method can include closing the first switch such that current builds in the first inductor while the capacitor is charged by current flowing through the second diode and the voltage sense circuit measures, from the second inductor, input voltage minus the voltage of the capacitor through the third diode, and then once charge current is reached, opening the first switch such that flyback current from the first inductor still charges capacitor forming a current loop from the capacitor through the first diode, through the first inductor, through the second diode, and back to the capacitor, during which time the voltage sense circuit senses, from the second inductor, pre-charge voltage across the capacitor. The method can include pulsing the first switch to change voltage readings until sensed pre-charge voltage about equals input voltage, then closing a main relay on the main power line while leaving the first switch closed, and pulsing the second switch thereafter to provide ongoing voltage measurement of capacitor voltage.

In certain embodiments, the flyback circuit can further include a third inductor magnetically coupled to the first and second inductor. The at least one switch can include a first switch. The first inductor can be disposed between the pre-charge input line and the first switch. The first switch can be configured to selectively allow current to pass from the main input line and the pre-charge input line to the first inductor. The circuit can further include a return line connected to the ground line, and a first line connected to between the third inductor and the output-to-capacitor line. The third inductor can be disposed between the return line and the first line. The circuit can include a second line connected between the first line and the pre-charge input line. The at least one diode can include a first diode disposed on the first line and configured to allow current flow toward the capacitor, and a second diode disposed on the second line and configured to allow current flow from the first line to the pre-charge input line, wherein the second inductor is connected in a voltage sense circuit.

The controller can be configured to perform a method to operate the circuit, the method comprising closing the first switch such that current builds the first inductor and the voltage sense circuit measures input voltage from the second inductor, and then opening the first switch such that the voltage sense circuit senses pre-charge voltage from the second inductor while flyback current through the third inductor charges the capacitor through the first diode. The method can include repeating until the input voltage and the pre-charge voltage are about the same, then closing a main relay on the main power line.

In certain embodiments, the flyback circuit can include a third inductor magnetically coupled to the first and second inductors, and the at least one switch can include a first switch. The first inductor can be disposed between the pre-charge input line and the first switch. The pre-charge input line can be connected to a low voltage control power and not to the main input line. The first switch can be configured to selectively allow current to pass from the pre-charge input line to the first inductor. The third inductor can be configured to convert the low voltage control power to a high voltage to charge the capacitor.

In certain embodiments, the circuit can include a return line connected to the ground line, and a first line connected to between the third inductor and the output-to-capacitor line. The third inductor can be disposed between the return line and the first line. The circuit can include a second line connected between the first line and the main input line. The at least one diode can include a first diode disposed on the first line and configured to allow current flow toward the capacitor, and a second diode disposed on the second line and configured to allow current flow from the first line to the main input line and/or the main power line. The second inductor can be connected in a voltage sense circuit.

In certain embodiments, the flyback circuit can include a fourth inductor magnetically coupled to the first, second, and third inductors. The circuit can include a return line connected to the ground line, a first line connected to between the third inductor and the output-to-capacitor line. The third inductor can be disposed between the return line and the first line. The circuit can include and a second line connected between the return line and the main input line. The fourth inductor can be disposed on the second line and the circuit can include a current sensor disposed on the second line to sense current on the second line through the fourth inductor. The at least one diode includes a first diode disposed on the first line and configured to allow current flow toward the capacitor, and a second diode disposed on the second line and configured to allow current flow toward the main input line and/or the main power line. The second inductor can be connected in a voltage sense circuit.

The circuit can include any other suitable circuit components and/or lines in any suitable connections. The controller can include any suitable hardware and/or software module(s) configured to perform any function disclosed herein, e.g., as described above. The controller can be configured to perform any other suitable method(s) and/or portion(s) thereof.

In accordance with at least one aspect of this disclosure, a capacitor pre-charge circuit configured to avoid inrush to a capacitor can include a flyback circuit configured to pre-charge the capacitor without high voltage resistive components. The circuit can include a voltage sense circuit that forms part of the flyback circuit. The circuit can include any embodiments of a circuit disclosed herein, e.g., as described above.

In accordance with at least one aspect of this disclosure, a method can include pre-charging a capacitor to an input power high voltage non-asymptotically. Pre-charging can include intermittent flyback. The method can include any other suitable method(s) and/or portion(s) thereof.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
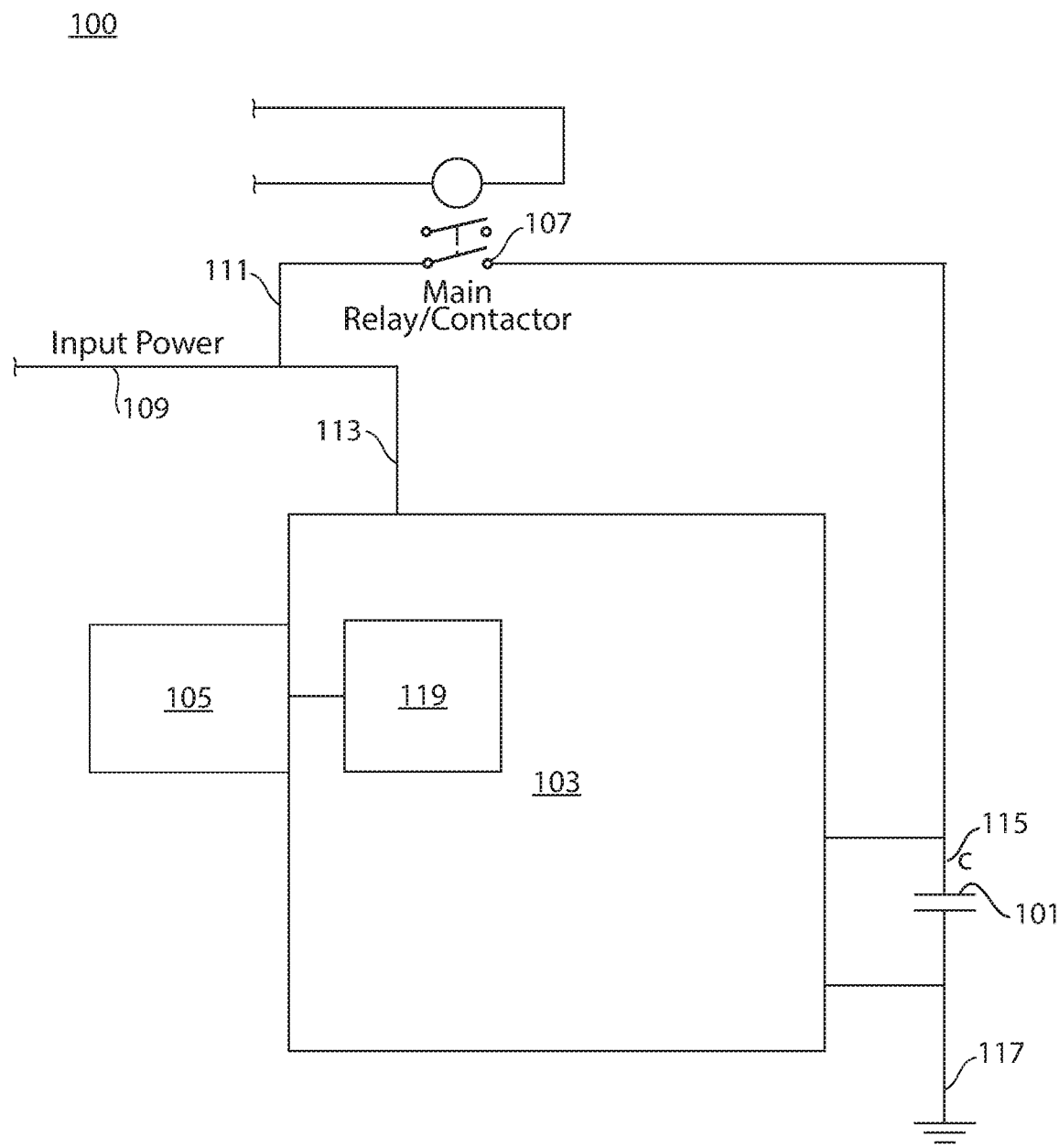
FIG. 1 is a schematic diagram of an embodiment of a circuit in accordance with this disclosure.

Reference will now be made to the drawings wherein like reference numerals identify similar structural features or aspects of the subject disclosure. For purposes of explanation and illustration, and not limitation, an illustrative view of an embodiment of a circuit in accordance with the disclosure is shown in FIG. 1 and is designated generally by reference character 100.

Other embodiments and/or aspects of this disclosure are shown in FIGS. 2-6. Certain embodiments described herein can be used to provide controlled active pre-charge of a capacitor (e.g., a DC link capacitor in an electric propulsion system).

Figure 2:
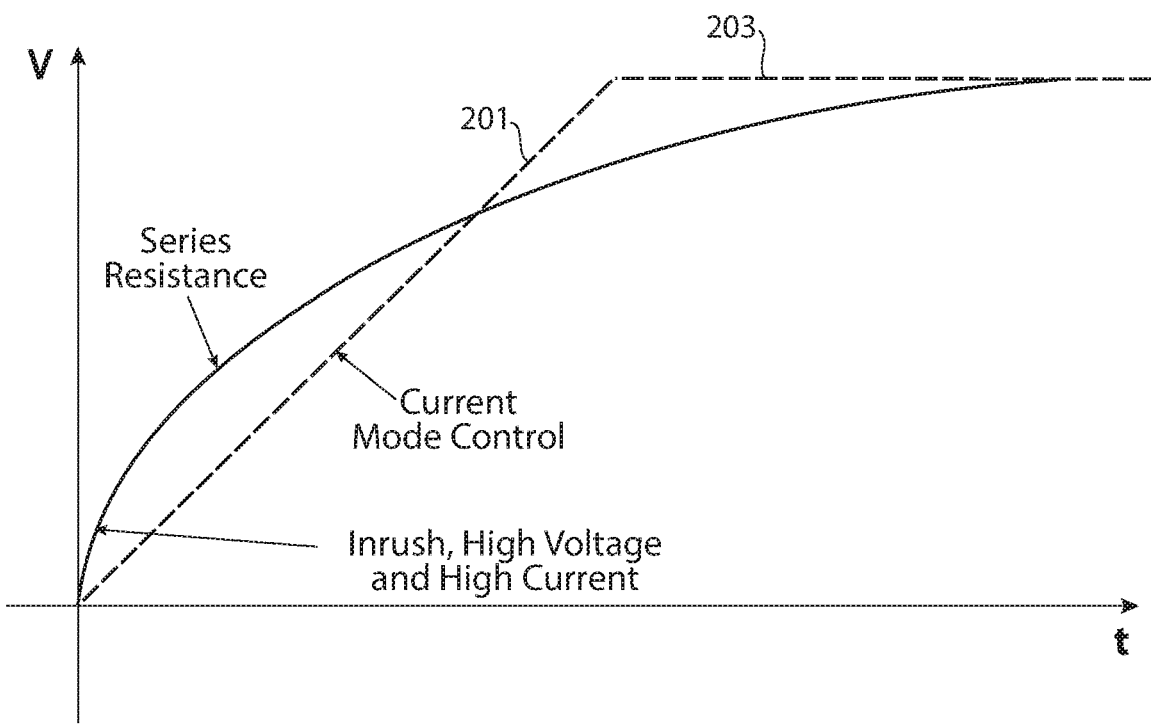
FIG. 2 is a chart comparing a pre-charge voltage curve in accordance with embodiments of this disclosure to a traditional pre-charge voltage curve using traditional structures.

Referring to FIG. 1, in certain embodiments, a capacitor pre-charge circuit 100 configured to avoid inrush to a capacitor 101 can include a plurality of components 103 configured to ramp a pre-charge voltage of the capacitor 101 over time up to a voltage maximum (e.g., input power voltage) such that the a pre-charge voltage-over-time curve is not an asymptote (e.g., as shown in the asymptotic curve in FIG. 2). For example, additionally referring to FIG. 2, the plurality of components 103 can be configured to linearly ramp voltage (e.g., at linear ramp 201) up to the voltage maximum 203. As shown, the voltage ramp 201 can achieve the maximum voltage 203 faster than an asymptotic curve generated by a traditional series resistor circuit, reducing the start-up time. It is contemplated that the plurality of components 103 can be actively controllable to achieve any desired ramp shape (e.g., linear ramp 201 as shown, or any other suitable shape), e.g., in which voltage ramps to a maximum voltage 203 faster than an asymptotic curve. Furthermore, it is contemplated that a plurality of switch modulation techniques can be employed to achieve desired ramp shape, including, but not limited to hysteresis-band current mode, center-based voltage or current mode, pulse-position current or voltage mode, fixed-edge voltage or current mode, etc.

In certain embodiments, the circuit 100 can include an integrated voltage sense circuit 105. The voltage sense circuit 105 can be configured to provide voltage readings of input power voltage and/or pre-charge voltage on the capacitor, for example, in one or more states of operation of the plurality of components 103.

As appreciated by those having ordinary skill in the art, one the capacitor 101 is pre-charged, a main relay 107 can be closed allowing the input power to travel directly to the capacitor 101. In certain embodiments, the pre-charge circuit 100 can include the capacitor 101 (e.g., a DC link capacitor). In certain embodiments, the pre-charge circuit 100 and/or the capacitor 101 can be integrated into any other electrical components (e.g., an electric motor power circuit).

In certain embodiments, the circuit 100 can include a main input line 109, a main power line 111 connected to the main input line 109, a pre-charge input line 113, an output-to-capacitor voltage line 115 connecting the capacitor 101 to the main power line 111 and the plurality of components 103 in parallel, a voltage sense circuit 105 configured to sense an input voltage and/or the pre-charge voltage, and a ground line 117 configured to connect the capacitor 101 to ground and the plurality of components 103 in parallel. In certain embodiments, e.g., as shown in the embodiments of FIGS. 1, 3, and 4, the pre-charge input line 113 can be connected to the main input line 109 in parallel with the main power line 111.

In certain embodiments, the plurality of components 103 can include a controller 119, at least one switch (e.g., a MOSFET or any other suitable type of switch, not shown in FIG. 1), and a flyback circuit (not shown in FIG. 1). The controller 119 can be configured to control the at least one switch to cause the flyback circuit to ramp the pre-charge voltage. The flyback circuit can include a first inductor (not shown in FIG. 1) magnetically coupled to a second inductor (not shown in FIG. 1) and at least one diode (not shown in FIG. 1) connected to the first inductor to form a flyback pathway. Certain non-limiting embodiments of circuits 300, 400, 500, and 600 are described below and each include an example of at least one switch and a flyback circuit.

Figure 3:
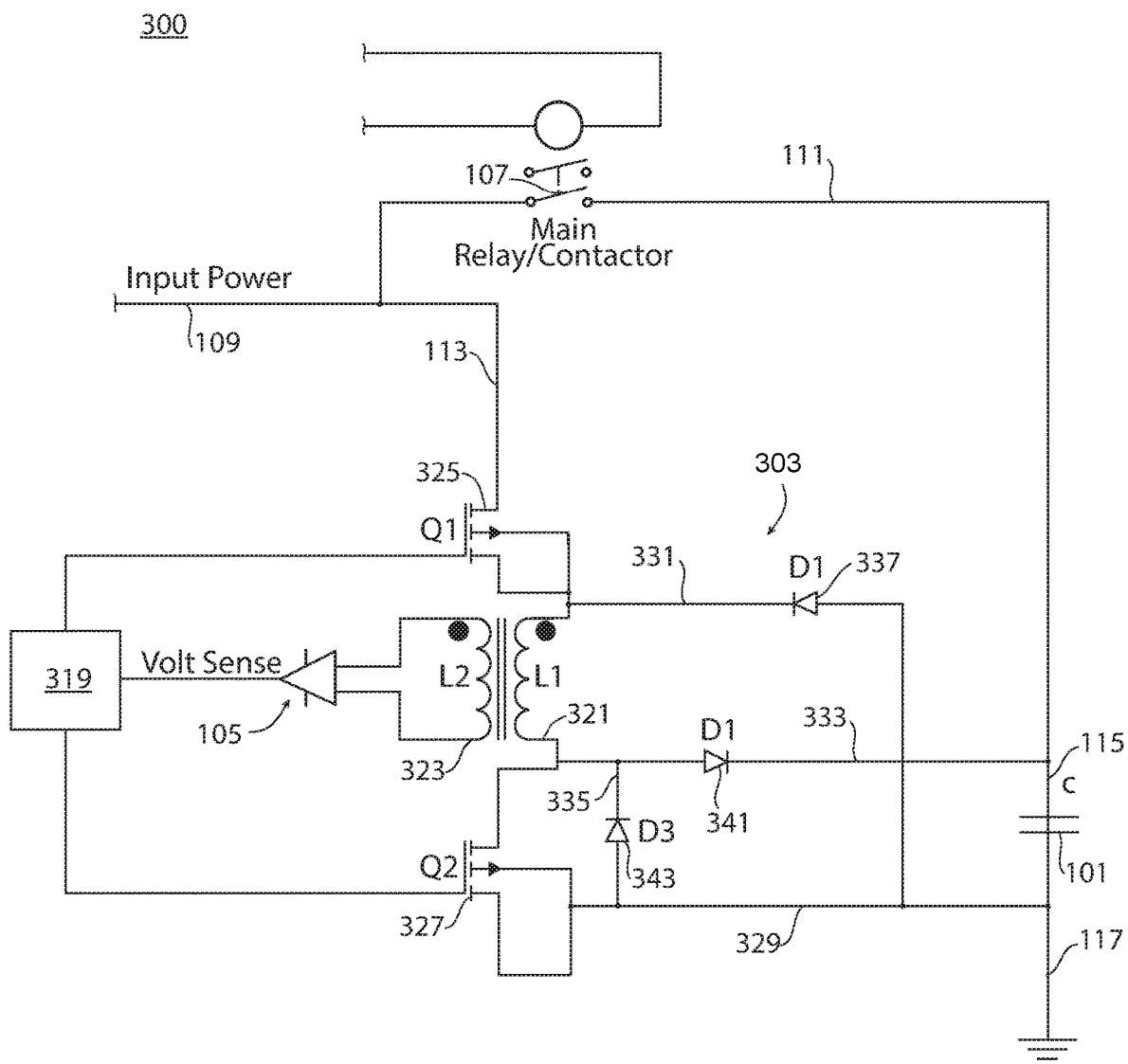
FIG. 3 is a schematic diagram of an embodiment of a circuit in accordance with this disclosure.
Figure 4:
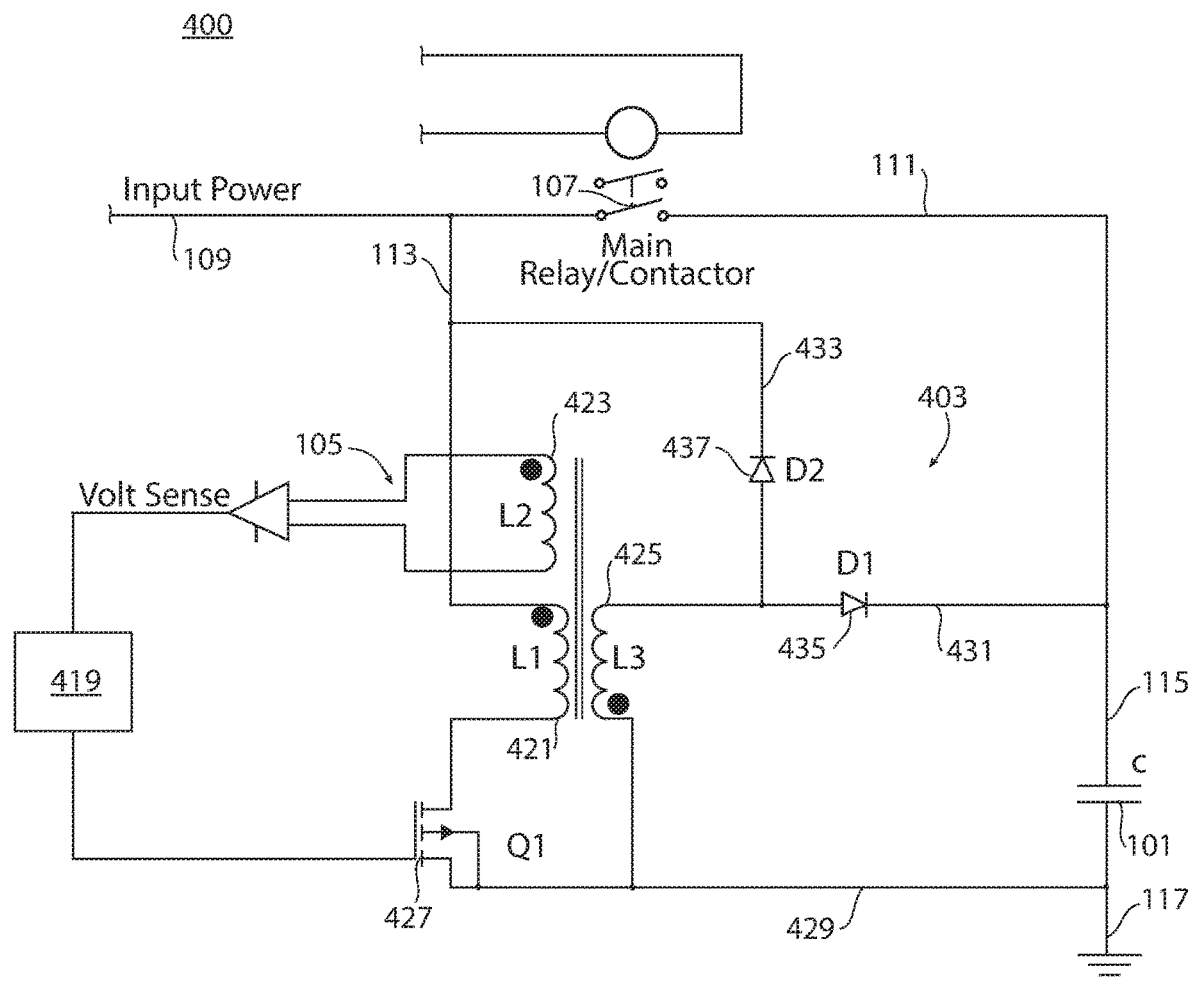
FIG. 4 is a schematic diagram of an embodiment of a circuit in accordance with this disclosure.

Referring to FIG. 3, in certain embodiments, a circuit 300 can include a plurality of components 303 having a flyback circuit including a first inductor 321 and a second inductor 323 magnetically coupled to the first inductor 321. The at least one switch can include a first switch 325 and a second switch 327. The first switch 325 can be disposed on the pre-charge input line 113 between the main input line 109 and the first inductor 321 to selectively allow current to pass from the main input line 109 and the pre-charge input line 113 to the first inductor 321.

The circuit 300 can include a return line 329 connected to the ground line 117 and a first line 331 connected to the pre-charge input line 113 in between of the first inductor 321 and the first switch 325 such that the first line 331 is in parallel with the pre-charge line 113 ahead of the first inductor 321 (e.g., downstream of the first switch 325). The first line 331 can be connected to the return line 329, for example.

The circuit 300 can include a second line 333 connected in between of the first inductor 321 and the second switch 327. The second line 333 can also be connected to the output-to-capacitor line 115, e.g., as shown. The circuit 300 can include a third line 335 connected to the second line 333 and the return line 329.

The first inductor 321 can be disposed between the first line 331 and the second line 333, e.g., as shown. The at least one diode can include a first diode 337 disposed on the first line 331 and configured to allow current flow toward the first inductor 337 (on the first line 331), a second diode 341 disposed on the second line 333 and configured to allow current flow toward the capacitor 101 (on the second line 333 to the output-to-capacitor line 115), and a third diode 343 disposed on the third line 335 and configured to allow current flow from the return line 329 to the second line 333.

The second switch 327 can be disposed between the first inductor 321 and/or second line 333 and the return line 329, e.g., as shown. The second inductor 323 can be connected in a voltage sense circuit 105, for example, as shown.

A controller 319 can be operatively connected to each switch 325, 327 to control each switch 325, 327, to the main relay 107 to control the main relay 107, and to the voltage sense circuit 319 to receive voltage readings. The controller 319 can be configured to perform a method to operate the circuit 300. The method can include closing the first switch 325 such that current builds in the first inductor 321 while the capacitor 101 is charged by current flowing through the second diode 341 and the voltage sense circuit 105 measures, from the second inductor 323, input voltage (from main input line 109) minus the voltage of the capacitor 101 through the third diode 343.

The method can include (e.g., after a short duty cycle of about 100 KHz once charge current is reached) then opening the first switch 325 such that flyback current from the first inductor 321 still charges capacitor 101 forming a current loop from the capacitor 101 through the first diode 337, through the first inductor 321, through the second diode 341, and back to the capacitor 101, during which time the voltage sense circuit 105 senses, from the second inductor 323, pre-charge voltage across the capacitor 101. The method can include pulsing the first switch 325 to change voltage readings until sensed pre-charge voltage about equals sensed input voltage, then closing a main relay 107 on the main power line 111 while leaving the first switch 325 closed, and pulsing the second switch 327 thereafter to provide ongoing voltage measurement of capacitor voltage.

As shown in FIG. 3, certain embodiments include a pre-charge buck regulator that uses a fly-back transformer as the inductor. Embodiments allow the voltage sense winding to sense voltage in both states. The turns-ratio of the fly-back transformer can be configured to scale the voltage in the voltage sense circuit 105 to be scaled to "signal level" regardless of how high the input power voltage is. In the "charge state", current can be conducted through the first switch (e.g., for a short duty cycle of about 100 KHz for example), and the second diode to the capacitor and the second switch can be left open. The voltage sense in this state is a measure of the input power voltage, and must be sampled while the first switch is closed. In the "buck" or "fly-back" state, current decays through the first diode and the second diode, and the voltage sense in this state is a measure of the negative of the pre-charge voltage. Pre-charge voltage must be sampled while the first switch is open.

Once the capacitor has charged, the main relay/contactor can be closed. The first switch can be then left closed, and second switch pulsed (e.g., very low duty cycle). While the second switch is on, the voltage sense can provide a measurement of capacitor (e.g., DC link) voltage. The duty cycle for pulsing can be very low (e.g., on the order of a few microseconds, about 100 KHz) because fly-back voltage can be small, so the current decay can be slow. In certain embodiments, the first switch and the second switch can be opened at the same time to rapidly discharge inductor flyback, which can speed up voltage sense.

Embodiments such as that shown in FIG. 3 use only a single high voltage winding (the first inductor), but use two high voltage switches (e.g., switching transistors as shown). Such embodiments allow both input voltage and pre-charge voltage to be sensed. Interpretation of the voltage measurements can account for losses and drops in the circuit 300.

Referring to FIG. 4, in certain embodiments, a circuit 400 can include a plurality of components 403 comprising a flyback circuit having a first inductor 421 and a second inductor 423. The plurality of components 403 can further include a third inductor 425 magnetically coupled to the first inductor 421 and second inductor 423.

In embodiments such as that shown in FIG. 4, the at least one switch can include a first switch 427. The first inductor 421 can be disposed between the pre-charge input line 113 and the first switch. The first switch 427 can be configured to selectively allow current to pass from the main input line 109 and the pre-charge input line 113 to the first inductor 421. The circuit 400 can further include a return line 429 connected to the ground line 117, and a first line 431 connected to between the third inductor 425 and the output-to-capacitor line 115. As shown, the third inductor 425 can be disposed between the return line 429 and the first line 431.

The circuit 400 can include a second line 433 connected between the first line 431 and the pre-charge input line 113. In embodiments such as that shown in FIG. 4, the at least one diode can include a first diode 435 disposed on the first line 431 and configured to allow current flow toward the capacitor 101. The at least one diode can also include a second diode 437 disposed on the second line 433 and configured to allow current flow from the first line 431 to the pre-charge input line 113 (e.g., to prevent overcharge of the capacitor 101). Similar to the embodiment shown in FIG. 3, the second inductor 423 can be connected in a voltage sense circuit 105.

The controller 419 can be connected to the first switch 427 to control the first switch 427, to the main relay 107 to control the main relay 107, and to the voltage sense circuit 105 to receive voltage readings. The controller 419 can be configured to perform a method to operate the circuit 400. The method can include closing the first switch 427 such that current builds the first inductor 421 and such that the voltage sense circuit 105 measures input voltage from the second inductor 423. The method can include (e.g., after a few microseconds) then opening the first switch 427 such that the voltage sense circuit 105 senses pre-charge voltage from the second inductor 423 while flyback current through the third inductor 425 charges the capacitor 101 through the first diode 435. The method can include repeating (e.g., at a low duty cycle, e.g., about 100 KHz) until the input voltage and the pre-charge voltage are about the same, at which point the method can include then closing the main relay 107 on the main power line 113.

Embodiments such as that shown in FIG. 4 can use only one high voltage switching device (e.g., switch 427), but use two high voltage flyback windings (e.g., first inductor 421 and third inductor 425). Such embodiments can also simultaneously (e.g., alternating) measure both input voltage and pre-charge voltage. When the first switch is closed, there is current in in the first inductor from the pre-charge line, and the voltage sense can provide a signal level measurement of the input power voltage. This measurement must be sampled while the first switch is closed. When the first switch is opened, the third inductor "flies back" to charge the capacitor. At this time, the voltage sense can provide the negative of the pre-charge voltage during flyback, which must be sample while the first switch is open.

Once the pre-charge voltage has risen to match the input power voltage, the main relay/contactor can be closed. Thereafter, the voltage sense will measure the combined node in both the charge and fly-back states. The second diode is positioned and configured to protect the capacitor from overcharge, for example. Such embodiments provide a good compromise between cost and fault tolerance.

Figure 5:
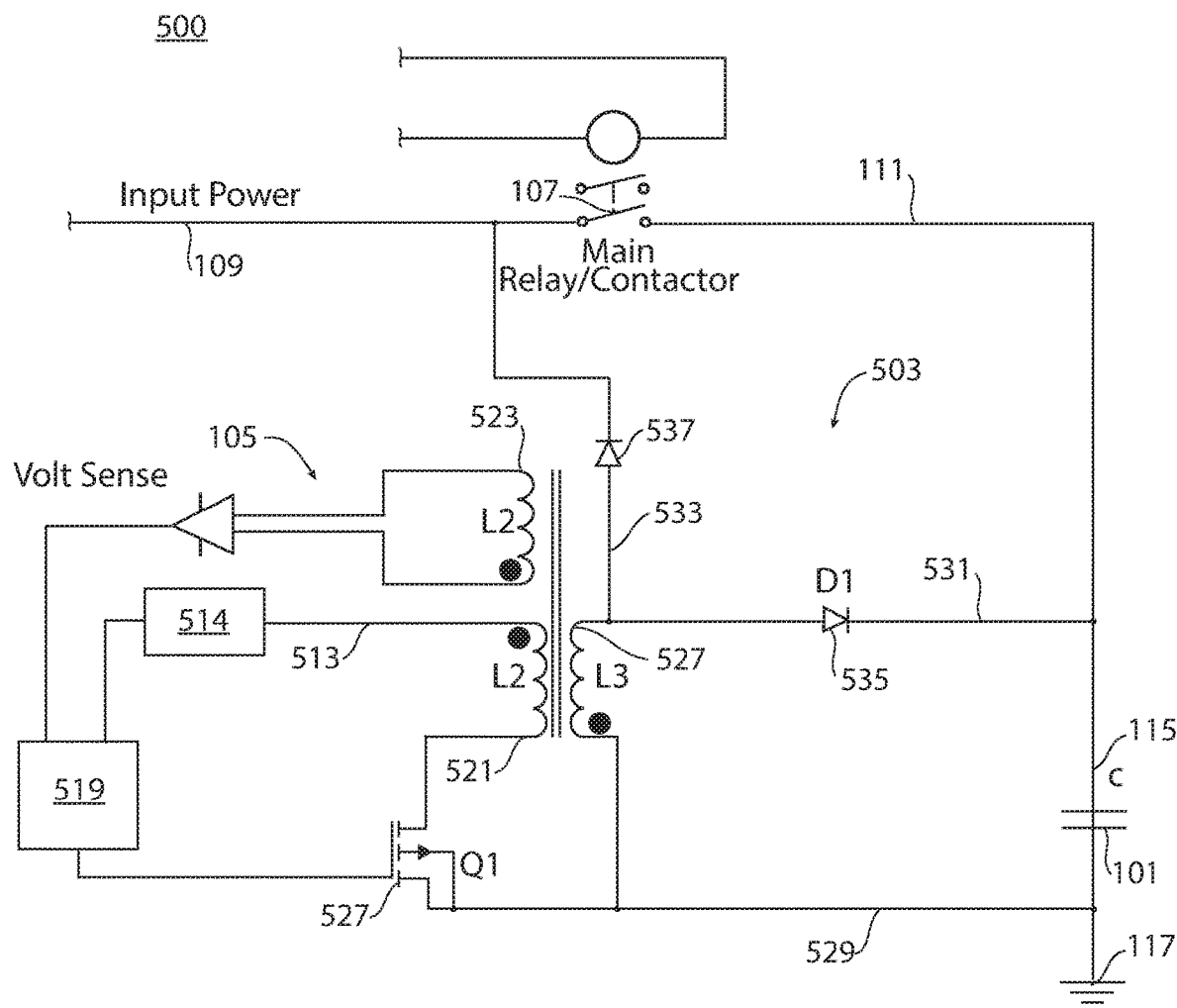
FIG. 5 is a schematic diagram of an embodiment of a circuit in accordance with this disclosure.

Referring now to FIG. 5, in certain embodiments, a circuit 500 can include a plurality of components 503 that form a flyback circuit including a first inductor 521, a second inductor 523, and a third inductor 525 magnetically coupled to the first and second inductors 521, 523. Similar to the embodiment shown in FIG. 4, the at least one switch can include a first switch 527 and the first inductor 521 can be disposed between the pre-charge input line and the first switch 527. However, the pre-charge input line 513 can be connected to a low voltage control power 514 and not to the main input line 109 as shown.

The first switch 527 can be configured to selectively allow current to pass from the pre-charge input line 513 to the first inductor 521. The third inductor 527 can be configured to convert the low voltage control power to a high voltage to charge the capacitor 101 (e.g., such that the first inductor 521 and the third inductor 527 form a step-up transformer).

In certain embodiments, the circuit can include a return line 529 connected to the ground line 117, and a first line 531 connected to between the third inductor 527 and the output-to-capacitor line 115. The third inductor 527 can be disposed between the return line 529 and the first line 531. The circuit 500 can include a second line 533 connected between the first line 531 and the main input line 109. The at least one diode can include a first diode 535 disposed on the first line 531 and configured to allow current flow toward the capacitor 101 (on the first line 531), and a second diode 537 disposed on the second line 533 and configured to allow current flow from the first line 531 (e.g., from the capacitor 101 through the first inductor 521) to the main input line 109 and/or the main power line 111. Similar to the above described embodiments, the second inductor 523 can be connected in a voltage sense circuit 105.

The controller 519 can be connected to the first switch 527 to control the first switch 527, to the main relay 107 to control the main relay 107, and to the voltage sense circuit 105 to receive voltage readings. In certain embodiments, the controller 519 can be connected to the low voltage control power 514 to control the power supply therefrom. The controller 519 can be configured to perform any suitable method to pre-charge the capacitor 101, e.g., similar to the method described with respect to the embodiment of FIG. 4 except that input voltage may not be sensed through second inductor 523 due to the arrangement of the pre-charge input line 513. In certain embodiments, instead of comparing input voltage to the pre-charge voltage, the controller 519 can be configured to operate the first switch 527 (e.g., low duty cycle) until flyback voltage readings (which indicate pre-charge voltage on the capacitor) no longer rise indicating that the capacitor 101 is charged, and thereafter close the main relay 107. In certain embodiments, the controller 519 can be configured to simple perform a pre-charging routine for a fixed period of time (e.g., a set amount of cycles of closing and opening the first switch 527 to ramp the charge). Embodiments such as though shown in FIG. 5 have no high voltage switching device (because the switch 527 is on the low voltage control power side), and only one high voltage transformer winding (e.g., the third inductor 527). Such embodiments may only measure the lower of the two voltages, input power or pre-charge and may not have a direct means of determining when the pre-charge voltage has reached the input power voltage, other than the pre-charge voltage discontinues rising. However, the size, weight, and cost of the circuit 500 can be less than prior embodiments. Once the main relay/contactor is closed, the voltage sense can continue to provide voltage of the combined node. The current may be very low in the voltage sense only mode.

Figure 6:
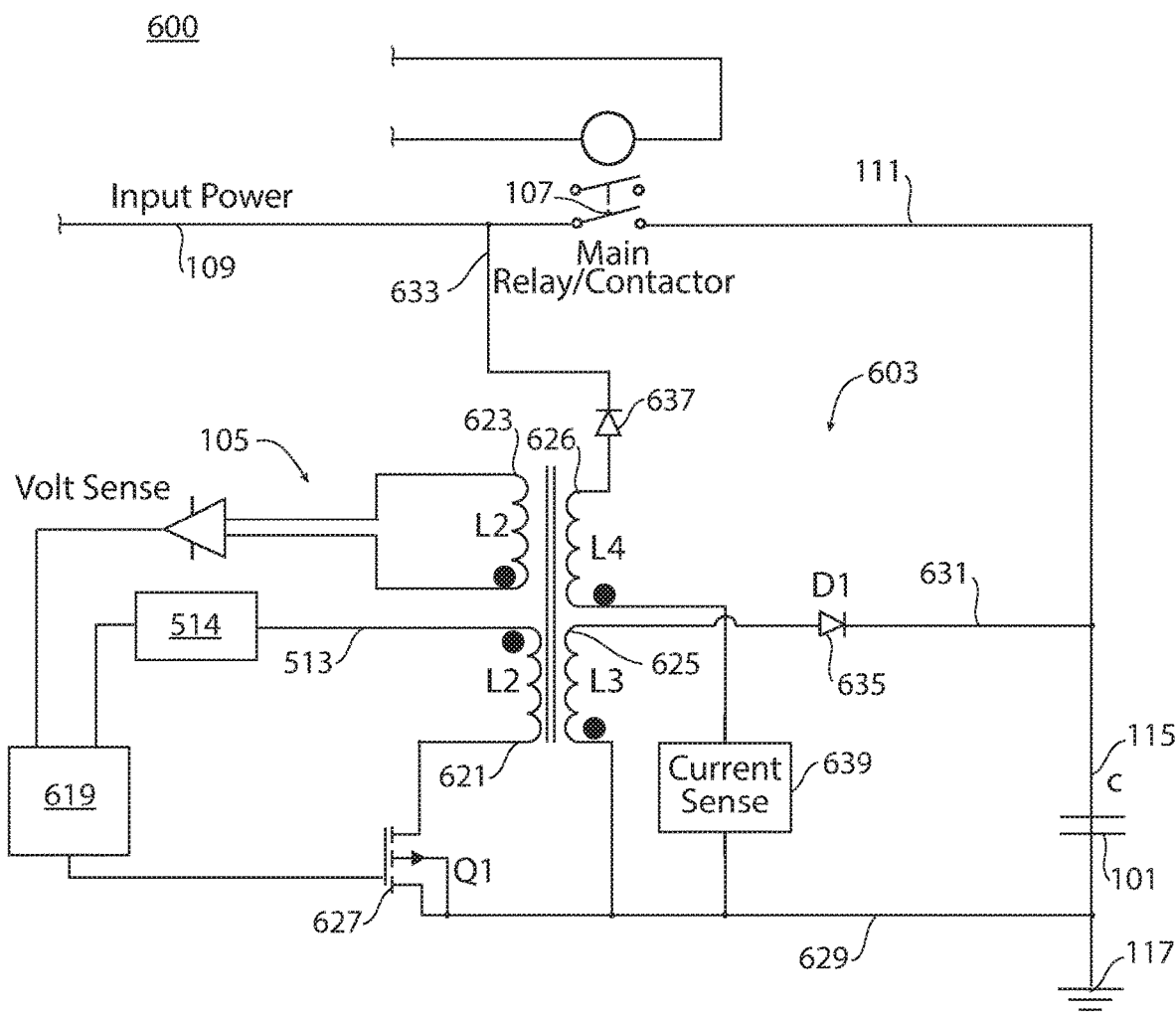
FIG. 6 is a schematic diagram of an embodiment of a circuit in accordance with this disclosure.

Referring now to FIG. 6, in certain embodiments, a circuit 600 can include a plurality of components 603 that form a flyback circuit including a first inductor 621, a second inductor 623, and a third inductor 625 magnetically coupled to the first and second inductors 621, 623. The flyback circuit can also include a fourth inductor 626 magnetically coupled to the first, second, and third inductors 621, 623, 625. Similar to the embodiments shown in FIGS. 4 and 5, the at least one switch can include a first switch 627 and the first inductor 621 can be disposed between the pre-charge input line 513 and the first switch 527. Similar to the embodiment shown in FIG. 5, the pre-charge input line 513 can be connected to a low voltage control power 514 and not to the main input line 109 as shown.

The circuit 600 can include a return line 629 connected to the ground line 117, a first line 631 connected to between the third inductor 625 and the output-to-capacitor line 115. The third inductor 625 can be disposed between the return line 629 and the first line 631. The circuit 600 can include and a second line 633 connected between the return line 629 and the main input line 109.

In certain embodiments, e.g., as shown, the fourth inductor 626 can be disposed on the second line 633 and the circuit 600 can include a current sensor 641 disposed on the second line to sense current on the second line 633 through the fourth inductor 626. Similar to the embodiments shown in FIGS. 4 and 5, the at least one diode can include a first diode 635 disposed on the first line 631 and configured to allow current flow toward the capacitor 101 (on the first line 631), and a second diode 637 disposed on the second line 633 and configured to allow current flow toward the main input line 109 and/or the main power line 111. Similar to the above described embodiments, the second inductor 623 can be connected in a voltage sense circuit 105.

The controller 619 can be connected to the first switch 627 to control the first switch 627, to the main relay 107 to control the main relay 107, and to the voltage sense circuit 105 to receive voltage readings. In certain embodiments, the controller 619 can be connected to the low voltage control power 514 to control the power supply therefrom. The controller 619 can be configured to perform any suitable method to pre-charge the capacitor 101, e.g., similar to the method described with respect to the embodiment of FIGS. 4 and/or 5. For example, the controller 619 can close the first switch 627, which causes current build up in first inductor 621, then close the first switch 627 (e.g., after a few microseconds), which causes flyback such that the capacitor 101 charges from the third inductor 625. This can be repeated until the capacitor 101 is charged.

Embodiments such as that shown in FIG. 6 include two high voltage transformer windings (third and fourth inductors 625, 626), but may no high voltage switching devices (because switch 627 is on the low voltage side). For very high voltages, current state of the art switching devices are limited to about 1.7 KV. However, diodes rated at tens-of-KV are readily available. Very high voltage Fly-back transformers are also available. Thus embodiments enable the use of a switching mechanism for high voltage applications. Also, such embodiments may not measure both the input power and pre-charge voltage at the same time through the second inductor 623, e.g., similar as described above with respect to the embodiment of FIG. 5. Such embodiments may be only able to measure the smaller of the two. However, a current sensor can be placed on the second line 633 with the fourth inductor 626 to determine when pre-charge is complete, if desired. Once the main relay contactor is closed, the voltage sense can continue to provide voltage of the combined node, e.g., as long as the first switch continues to commutate. The current can be very low in the voltage sense only mode.

The circuit 100, 300, 400, 500, 600 can include any other suitable circuit components and/or lines in any suitable connections. The controller 119, 319, 419, 519 can include any suitable hardware and/or software module(s) configured to perform any function disclosed herein, e.g., as described above. The controller 119, 319, 419, 519 can be configured to perform any other suitable method(s) and/or portion(s) thereof.

In accordance with at least one aspect of this disclosure, a capacitor pre-charge circuit configured to avoid inrush to a capacitor can include a flyback circuit (e.g., formed by components 303, 403, 503, 603) configured to pre-charge the capacitor without high voltage resistive components. The circuit can include a voltage sense circuit that forms part of the flyback circuit. The circuit can include any embodiments of a circuit disclosed herein, e.g., as described above.

In accordance with at least one aspect of this disclosure, a method can include pre-charging a capacitor to an input power high voltage non-asymptotically. Pre-charging can include intermittent flyback (e.g., for non-asymptotic charging or otherwise). The method can include any other suitable method(s) and/or portion(s) thereof.

As the aircraft electrical systems strive to advance toward electric propulsion, both voltages and currents must increase by orders-of-magnitude. While much of this power may be AC for safety reasons, there will still remain instances where very high voltage DC voltage must be measured in a continuous manner (i.e. DC Link).

Embodiments address at least two problems. First, traditional systems have cumbersome circuitry required for pre-charging DC link capacitors which gets worse as voltages increase. Traditional voltage sense circuitry relies on resistor dividing and is either prone to leakage due to moisture, or is too power dissipative.

Embodiments can use of a low-power fly-back transformer to provide active current control of DC link capacitor pre-charge, and also provides sense windings for voltage measurements. Embodiments can reduce power dissipation and moisture sensitivity/leakage in DC voltage measurements, can provide linear pre-charge current for more efficient pre-charge of DC link capacitors, and can provide energy transfer using reactive elements for more efficient capacitor pre-charge.

As disclosed above, a small power converter can be used to pre-charge the capacitor. Current control can allow the charge rate to be approximately linear. The charge rate can be slow enough to keep the pre-charge converter small, but fast enough to avoid system startup delays. Embodiments avoids the large initial inrush seen by series resistors, while still reaching full charge faster than an "asymptotic" charge.

The same power conversion can be used to sense voltage, and eliminate the problems of long resistor chains. Embodiments can do so by use of a fly-back transformer with a voltage sense winding built with a turns ratio to produce a signal-level voltage measurement, for example. There are many variations of such a pre-charge converter with integral voltage sense, and the above embodiments are non-limiting examples. Embodiments do not require a dissipative element that takes the initial spike, and embodiments can control voltage such that the rate of voltage rise is constant and achieves full voltage (on the order of about a second or two) faster than traditional circuits.

As will be appreciated by those skilled in the art, aspects of the present disclosure may be embodied as a system, method or computer program product. Accordingly, aspects of this disclosure, e.g., a controller as disclosed above, may take the form of an entirely hardware embodiment, an entirely software embodiment (including firmware, resident software, micro-code, etc.), or an embodiment combining software and hardware aspects. For example, a controller as disclosed above can be a single self-contained unit (e.g., of hardware and/or software) or include any suitable number of separate parts or software components. Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A capacitor pre-charge circuit configured to avoid inrush to a capacitor, comprising:
   a plurality of components configured to ramp a pre-charge voltage over time up to a voltage maximum such that the a pre-charge voltage-over-time curve is not asymptotic, wherein the plurality of components are configrued to linearly ramp voltage to the voltage maximum, wherein the plurality of components include:
   a controller;
   at least one switch; and
   a flyback circuit, wherein the controller is configured to control the at least one switch to cause the flyback circuit to ramp the pre-charge voltage;
   a maim input line;
   a main power line connected to the main input line;
   a pre-charge input line;
   an output-to-capacitor voltage line connecting the capacitor to the main power line and the plurality of components in parallel;
   a voltage sense circuit configured to sense an input voltage and/or the pre-charge voltage; and
   a ground line configured to connect the capacitor to ground and the plurality of components in parallel.

2. The circuit of claim 1, wherein the pre-charge input line is connected to the main input line in parallel with the main power line.

3. The circuit of claim 1, wherein the flyback circuit includes a first inductor magnetically coupled to a second inductor and at least one diode connected to the first inductor to form a flyback pathway.

4. The circuit of claim 3, wherein the at least one switch includes a first switch and a second switch, wherein the first switch is disposed on the pre-charge input line between the main input line and the first inductor to selectively allow current to pass from the main input line and the pre-charge input line to the first inductor.

5. The circuit of claim 4, further comprising:
   a return line connected to the ground line;
   a first line connected to the pre-charge input line in between of the first inductor and the first switch such that the first line is in parallel with the pre-charge line ahead of the first inductor, wherein the first line is connected to the return line;
   a second line connected in between of the first inductor and the second switch and to the output-to-capacitor line, wherein the first inductor is disposed between the first line and the second line; and
   a third line connected to the second line and the return line,
   wherein the at least one diode includes a first diode disposed on the first line and configured to allow current flow toward the first inductor, a second diode disposed on the second line and configured to allow current flow toward the capacitor, and a third diode disposed on the third line and configured to allow current flow from the return line to the second line, wherein the second switch is disposed between the first inductor and/or second line and the return line, wherein the second inductor is connected in a voltage sense circuit.

6. The circuit of claim 5, wherein the controller is configured to perform a method to operate the circuit, the method comprising:
   closing the first switch such that current builds in the first inductor while the capacitor is charged by current flowing through the second diode and the voltage sense circuit measures, from the second inductor, input voltage minus the voltage of the capacitor through the third diode;
   then once charge current is reached, opening the first switch such that flyback current from the first inductor still charges capacitor forming a current loop from the capacitor through the first diode, through the first inductor, through the second diode, and back to the capacitor, during which time the voltage sense circuit senses, from the second inductor, pre-charge voltage across the capacitor.

7. The circuit of claim 6, wherein the method includes pulsing the first switch to change voltage readings until sensed pre-charge voltage about equals input voltage, then closing a main relay on the main power line while leaving the first switch closed, and pulsing the second switch thereafter to provide ongoing voltage measurement of capacitor voltage.

8. The circuit of claim 3, wherein the flyback circuit further comprising a third inductor magnetically coupled to the first and second inductor, wherein the at least one switch includes a first switch, wherein the first inductor is disposed between the pre-charge input line and the first switch, wherein the first switch is configured to selectively allow current to pass from the main input line and the pre-charge input line to the first inductor.

9. The circuit of claim 8, further comprising:
a return line connected to the ground line;
a first line connected to between the third inductor and the output-to-capacitor line, wherein the third inductor is disposed between the return line and the first line; and
a second line connected between the first line and the pre-charge input line;
wherein the at least one diode includes a first diode disposed on the first line and configured to allow current flow toward the capacitor, and a second diode disposed on the second line and configured to allow current flow from the first line to the pre-charge input line, wherein the second inductor is connected in a voltage sense circuit.

10. The circuit of claim 9, wherein the controller is configured to perform a method to operate the circuit, the method comprising:
closing the first switch such that current builds the first inductor and the voltage sense circuit measures input voltage from the second inductor;
then opening the first switch such that the voltage sense circuit senses pre-charge voltage from the second inductor while flyback current through the third inductor charges the capacitor through the first diode; and
repeating until the input voltage and the pre-charge voltage are about the same, then closing a main relay on the main power line.

11. The circuit of claim 3, wherein the flyback circuit further comprising a third inductor magnetically coupled to the first and second inductors, and wherein the at least one switch includes a first switch, wherein the first inductor is disposed between the pre-charge input line and the first switch, wherein the pre-charge input line is connected to a low voltage control power and not to the main input line, wherein the first switch is configured to selectively allow current to pass from the pre-charge input line to the first inductor, wherein the third inductor is configured to convert the low voltage control power to a high voltage to charge the capacitor.

12. The circuit of claim 11, further comprising
a return line connected to the ground line;
a first line connected to between the third inductor and the output-to-capacitor line, wherein the third inductor is disposed between the return line and the first line; and
a second line connected between the first line and the main input line;
wherein the at least one diode includes a first diode disposed on the first line and configured to allow current flow toward the capacitor, and a second diode disposed on the second line and configured to allow current flow from the first line to the main input line and/or the main power line, wherein the second inductor is connected in a voltage sense circuit.

13. The circuit of claim 11, further comprising:
a fourth inductor magnetically coupled to the first, second, and third inductors;
a return line connected to the ground line;
a first line connected to between the third inductor and the output-to-capacitor line, wherein the third inductor is disposed between the return line and the first line; and
a second line connected between the return line and the main input line, wherein the fourth inductor is disposed on the second line; and
a current sensor disposed on the second line to sense current on the second line through the fourth inductor;
wherein the at least one diode includes a first diode disposed on the first line and configured to allow current flow toward the capacitor, and a second diode disposed on the second line and configured to allow current flow toward the main input line and/or the main power line, wherein the second inductor is connected in a voltage sense circuit.

14. A capacitor pre-charge circuit configured to avoid inrush to a capacitor, comprising:
a plurality of components configured to ramp a pre-charge voltage over time up to a voltage maximum such that the a pre-charge voltage-over-time curve is not asymptotic, wherein the plurality of components are configured to linearly ramp voltage to the voltage maximum;
a main input line;
a main power line connected to the main input line;
a pre-charge input line, wherein the pre-charge input line is connected to the main input line in parallel with the main power line;
an output-to-capacitor voltage line connecting the capacitor to the main power line and the plurality of components in parallel;
a voltage sense circuit configured to sense an input voltage and/or the pre-charge voltage; and
a ground line configured to connect the capacitor to ground and the plurality of components in parallel.

15. A capacitor pre-charge circuit configured to avoid inrush to a capacitor, comprising:
a plurality of components configured to ramp a pre-charge voltage over time up to a voltage maximum such that the a pre-charge voltage-over-time curve is not asymptotic, wherein the plurality of components are configured to linearly ramp voltage to the voltage maximum, wherein the plurality of components include:
a controller;
at least one switch; and
a flyback circuit, wherein the controller is configured to control the at least one switch to cause the flyback circuit to ramp the pre-charge voltage.

* * * * *